United States Patent Office 3,471,530
Patented Oct. 7, 1969

3,471,530
PROCESS FOR THE PREPARATION OF 3-(LOWER ALKYLOXY)-17-KETOSTEROID-3,5,7-TRIENES
Gunther Kruger, Surendra N. Sehgal, and Claude Vezina, Montreal, Quebec, Canada, assignors to American Home Products Corporation, New York, N.Y., a corporation of Delaware
No Drawing. Filed Mar. 20, 1967, Ser. No. 624,194
Int. Cl. C07c *167/32, 169/10, 169/22*
U.S. Cl. 260—397.4      9 Claims

ABSTRACT OF THE DISCLOSURE

There is disclosed herein a process for preparing 3-(lower alkyloxy)-estra-3,5,7-trien-17-ones and 3-(lower alkoxy)-19-hydroxyandrosta-3,5,7-trien-17-ones, and for converting those compounds to equilin by microbiological means.

---

The present invention relates to a process for preparing 3-(lower alkyloxy)-17-ketosteroid-3,5,7-trienes which may be converted to equilin, a potent naturally occurring estrogen, by microbiological means.

More particularly, the present invention relates to a process of steroidal enol ethers represented by Formula I,

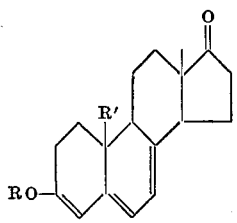

(I)

in which R represents a lower alkyl group, containing from 1–6 carbon atoms, such as, for example, methyl, ethyl, propyl, or hexyl groups, and R′ represents hydrogen or a hydroxymethyl group. These enol ethers are useful intermediates for the synthesis of equilin, an important estrogenic hormone; said intermediates may be prepared by the process of this invention more advantageously than other intermediates for preparing equilin described in the literature.

There is, for example, a process for the preparation of the steroidal enol ether, 3-acetoxyestra-3,5,7-trien-17-one, used for the preparation of equilin, and described by D. A. Irvine et al. U.S. Patent No. 3,272,848 and by J. F. Bagli, P. F. Morand, K. Wiesner, and R. Gaudry in Tetrahedron Letters 387, (1964) whereby a solution of estra-4,6-diene-3,17-dione in acetic anhydride, acetyl chloride and pyridine is boiled for a period of 2¼ hours. It is a particular advantage of the process of this invention that the preparation of the enol ethers, for example, 3-methoxyestra-3,5,7-trien-17-one, is achieved by much milder conditions and in a much shorter reaction time.

It is another advantage of the process of this invention that it permits obtention of Δ⁷-19-norsteroids from the easily available Δ⁴·⁶-3-ketosteroid-19-aldehydes and 19-carboxylic acids in a more efficient manner than known herebefore.

The preferred starting materials for the process of this invention are represented by Formula II,

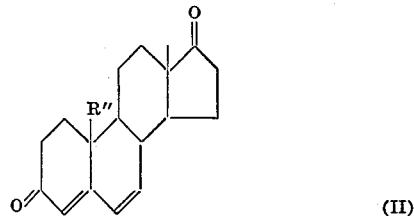

(II)

in which R″ represents hydrogen, formyl, carboxyl, or hydroxymethyl.

In a preferred embodiment of this invention estra-4,6-diene-3,17-dione (II, R″=H), prepared as described by K. Heusler, J. Kalvoda, Ch. Meystre, H. Ueberwasser, P. Wieland, G. Anner, and A. Wettstein, Experientia 18, 464 (1962), or in U.S. Patent No. 3,272,847, is treated with 0.1 to 80 parts, preferably 7.5 parts, of an alkali metal alkoxide of lower alkanols, such as, for example, potassium t-butoxide or preferably sodium methoxide, or an alkali metal hydroxide, such as, for example, potassium hydroxide, or sodium hydroxide, or an alkali metal hydride, such as, for example, sodium hydride, in dimethylsulfoxide solution or by using a previously prepared solution of methylsulfinyl anion in dimethylsulfoxide prepared according to Corey and Chaykovsky, J. Am. Chem. Soc., 84, 866 (1962) with or without an inert cosolvent such as, ether, benzene, or tetrahydrofuran, preferably in a nitrogen atmosphere for a period of 10 seconds to one hour, preferably 3 minutes, at temperatures ranging from −20° to +60° C., with preference to the 0°–20°C range. Subsequent treatment of the reaction mixture with a lower aliphatic alkanol such as, for example, methanol, ethanol, propanol, or hexanol, and with an excess of a strong acid, for example, hydrochloric, sulfuric, perchloric, or p-toluenesulfonic acid, at temperatures from −60° to 25° C., preferably −60 to 20° C. for a minimum period of five minutes, preferably 15–30 minutes yields the desired enol ether, such as, for example, 3-methoxyestra-3,5,7-trien-17-one (I, R=CH₃) respectively, which may be isolated by precipitation with a large amount of dilute aqueous alkali and purified by recrystallization.

In the same manner, but by replacing estra-4,6-dien-3,17-dione with either 3,17-dioxoandrosta - 4,6-dien-19-al (II, R″=CHO), described by K. Heusler et al. Experientia, 18,464 (1962), or with 3,17 - dioxoandrosta-4,6-dien- 19-oic acid (II, R″=COOH), described in U.S. Patent No. 3,250,792, and by using again the appropriate alcohol, the corresponding enol ethers such as, for example, 3-methoxyestra - 3,5,7-trien-17 - one, 3-ethoxy-estra-3,5,7-trien-17-one 3 - propoxyestra-3,5,7-trien-17-one and 3-hexyloxyestra - 3,5,7-trien - 17-one are respectively obtained.

Again in the same manner, but by replacing estra-4,6-diene - 3,17 - dione with 19-hydroxyandrosta-4,6-diene-3,17-dione (II, R″=CH₂OH), described by Heuseler et al., Experientia, 18, 464 (1962), and by using again the appropriate alcohol, the corresponding enol ethers, such as, for example, 19 - hydroxy-3 - methoxyandrosta-3,5,7-trien-17-one (I=R=CH₃, R′=CH₂OH) 3 - ethoxy-19-hydroxyandrosta - 3,5,7 - trien-17-one (I, R=C₂H₅, R′= CH₂OH), 19 - hydroxy - 3-propoxyandrosta-3,5,7-trien-17-one (I, R=C₃H₇, R′=CH₂OH), and 3 - hexyloxy-19- hydroxyandrosta - 3,5,7 - trien-17-one (I, R=C₆H₃, R'= CH₂OH) are respectively obtained. Those may be converted directly to equilin by a microbiological transformation described below.

By exposing the enol ethers of this invention to the activity obtainable in a suitable medium inoculated with microorganisms from the species Nocardia, such as, for example, *N. rubra* NRRL B-685, *N. corallina* ATCC 999, ATCC 13258 and ATCC 13259, *N. restrictus* ATCC 14887, *N. asteroides* ATCC 6846, ATCC 9970 and 10904, *N. canicruria* ATCC 17896, *N. erythropolis* ATCC 17895, *N. opaca* ATCC 4276, and *N. convoluta* ATCC 4275; *Arthrobacter simplex* ATCC 13260, Arthrobacter species ATCC 19140; *Corynebacterium simplex* ATCC 6946; Mycobacterium, such as, for example, *M. rhodochrous* ATCC 4273, and ATCC 9356, or *M. fortuitum* ATCC 6841; equilin is obtained. This may be accomplished by exposing the enol ethers to the enzymatic activity obtainable from a growing culture or from the resting cells of the microorganism.

The following examples will illustrate this invention.

Example 1.—3-methoxyestra-3,5,7-trien-17-one

A mixture of 5 g of estra-4,6-diene-3,17-dione, 3.75 g. of sodium methoxide is stirred at room temperature for 5 minutes in an atmosphere of nitrogen where upon 250 ml. of hexane, cooled below −60°C is added, followed by a solution 9 ml. concentrated sulfuric acid in 100 ml. of methanol, cooled below −60°C. The mixture is stirred for 17 minutes in an ice bath and is then poured into an excess of cold 1 N aqueous sodium hydroxide. The precipitated title compound if filtered and recrystallized from methanol, M.P. 178–185°C.

$\lambda_{max.}^{EtOH}$ 318 m$\mu$ ($\epsilon$ 18,200) $\nu_{max.}^{CHCl_3}$ 1730, 1645, 1620, 1570 cm.⁻¹.

In the same manner but using 3,17-dioxoandrosta-4,6-dien - 19-al, or 3,17-dioxoandrosta - 4,6-dien-19-oic acid as starting materials, but preferably carrying out the initial treatment with sodium methoxide at 60°C. when the latter starting material is used, the title compound is also obtained.

In the same manner as described above, but using 19-hydroxy-androsta - 4,6-diene - 3,17-dione as starting material, 19-hydroxy - 3-methoxyandrosta - 3,5,7-trien-17-one, M.P. 188–191°C.

$\lambda_{max.}^{MeOH}$ 320 m$\mu$ ($\epsilon$ 18,450) $\nu_{max.}^{CHCl_3}$ 1734, 1625, 1649 cm.⁻¹ is obtained

In the same manner as described above, but using n-hexanol instead of methanol, 3-hexyloxyestra-3,5,7-trien-17-one, M.P. 106–112°C.

$\lambda_{max.}^{MeOH}$ 321 m$\mu$ $\nu_{max.}^{Nujol}$ 1735, 1655, 1580, 1187, 1175, 851 cm.⁻¹ is also obtained.

Again in the same manner as described above, but using ethanol or propanol instead of methanol, 3-ethoxy- and 3-propoxyesta - 3,5,7-trien-17-one and 3-ethoxy-19-hydroxyandrosta-3,5,7-trien-17-one and 19-hydroxy-3-propoxyandrosta-3,5,7-trien-17-one are also obtained. With 19-hydroxyandrosta - 4,6-diene - 3,17-dione and n-hexanol as starting materials, 3 - hexyloxy-19 - hydroxyandrosta-3,5,7-trien-17-one is obtained.

Example 2.—Equilin

A culture of *Nocardia rubra* NRRL B-685 from an agar slant is used to inoculate a sterile nutrient broth (50 ml.) beef extract:peptone (3:5) in a 250 ml. Erlenmeyer flask. After a 24 hour incubation period a solution of progesterone (0.5 ml. concentration=10 mg./ml. of acetone) is added and the incubation is continued for another 24 hours. At that time 19-hydroxy-3 - methoxyandrosta-3,5,7-trien - 17 - one (5 mg.) in acetone (0.5 ml.) is added to the growing culture. After another 24 hour incubation period the contents of the fermentation flask are extracted twice with ethyl acetate:benzene (1:4). The organic extract is dried over sodium sulfate, filtered, and evaporated to dryness under reduced pressure. Equilin, identical with an authentic sample is isolated and identified by gas liquid chromatography as the main product of the reaction.

In the same manner but replacing *Nocardia rubra* NRRL B-685 with microorganisms from other species of Nocardia, such as, for example, *N. corallina* ATCC 999, ATCC 13258, and ATCC 13259, *N. restrictus* ATCC 14-887, *N. asteroides* ATCC 6846, ATCC 9970 and 10904, *N. canicruria* ATCC 17896, *N. erythropolis* ATCC 17895, *N. opaca* ATCC 4276, and *N. convuluta* ATCC 4275; or with microorganisms from such species as *Arthrobacter simplex* ATCC 13260, Arthrobacter species ATCC 19140, *Corynebacterium simplex* ATCC 6946; Mycobacterium, such as, for example, *M. rhodochrous*, ATCC 4273, and ATCC 9356, or *M. fortuitum* ATCC 6841; equilin is also obtained.

Again in the same manner but by substituting an equivalent amount of 3 - ethoxy-19-hydroxyandrosta - 3,5,7-trien - 17-one or 19 - hydroxy-3-propoxyandrosta-3,5,7-trien - 17 - one or 3-hydroxy-19-hydroxyandrosta-3,5,7-trien-17-one or 3 - methoxy-, 3-ethoxy-3 - propoxy-, or 3 - hexyloxyestra - 3,5,7 - trien - 17-one for 19-hydroxy-3-methoxyandrosta - 3,5,7 - trien-17-one, and using any of the microorganisms mentioned above, equilin is obtained.

We claim:

1. The process of preparing a steroidal enol ether which comprises treating a compound of the formula

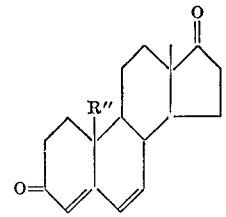

wherein R″ is selected from the group which consists of hydrogen, formyl, carboxyl and hydroxymethyl with a base selected from the group which consists of alkali metal alkoxides of lower alkanols, alkali metal hydroxides, alkali metal hydrides and a solution containing methylsulfinyl anion, said treatment being carried out at a temperature within the range −20° to 60° C.; and treating the resulting reaction mixture with a lower aliphatic alkanol and an excess of strong acid at a temperature within the range −60° to 25° C.

2. The process as claimed in claim 1 wherein the starting material is estra-4,6-diene-3,17-dione, the lower alkanol is methanol, and the enol ether prepared is 3-methoxyestra-3,5,7-trien-17-one.

3. The process as claimed in claim 1 wherein the starting material is 3,17 - dioxoandrosta-4,6-dien-19-al, the lower alkanol is methanol and the enol ether prepared is 3-methoxyestra-3,5,7-trien-17-one.

4. The process as claimed in claim 1 wherein the starting material is 3,17-dioxoandrosta - 4,6-dien-19-oic acid, the lower alkanol is methanol, and the enol ether prepared is 3-methoxyestra-3,5,7-trien-17-one.

5. The process as claimed in claim 1 wherein the starting material is 19 - hydroxy-androsta-4,6-diene-3,17-dione, the lower alkanol is methanol and the enol ether prepared is 19- hydroxy - 3 - methoxyandrosta-3,5,7-trien-17-one.

6. The process as claimed in claim 1 wherein the starting material is estra-4,6-diene-3,17-dione, the lower alkanol is n-hexanol, and the enol ether prepared is 3-hexyloxyestra-3,5,7-trien-17-one.

7. The process as claimed in claim 1 wherein the starting material is estra-4,6-diene-3,17-dione, the lower alkanol is ethanol and the enol ether prepared is 3-ethoxyestra-3,5,7-trien-17-one.

8. The process as claimed in claim 1 wherein the starting material is estra-4,6-diene-3,17-dione, the lower alkanol is propanol and the enol ether prepared is 3-propoxy-estra-3,5,7-trien-17-one.

9. The process as claimed in claim 1 wherein the starting material is 19-hydroxyandrosta-4,6-diene-3,17-dione, the lower alkanol is n-hexanol and the enol ether prepared is 3-hexyloxy-19-hydroxyandrosta-3,5,7-trien-17-one.

References Cited

UNITED STATES PATENTS 3,153,060  10/1964  Cooley et al. _____ 260—397.2
3,272,848  9/1966  Irvine et al. _____ 260—397.3

ELBERT L. ROBERTS, Primary Examiner

U.S. Cl. X.R.

195—51